June 3, 1969  L. CARDWELL  3,447,693
COMBINED HYDRAULIC CUSHION-FRICTION CLUTCH DRAFT GEAR
Filed Nov. 2, 1967  Sheet 3 of 3

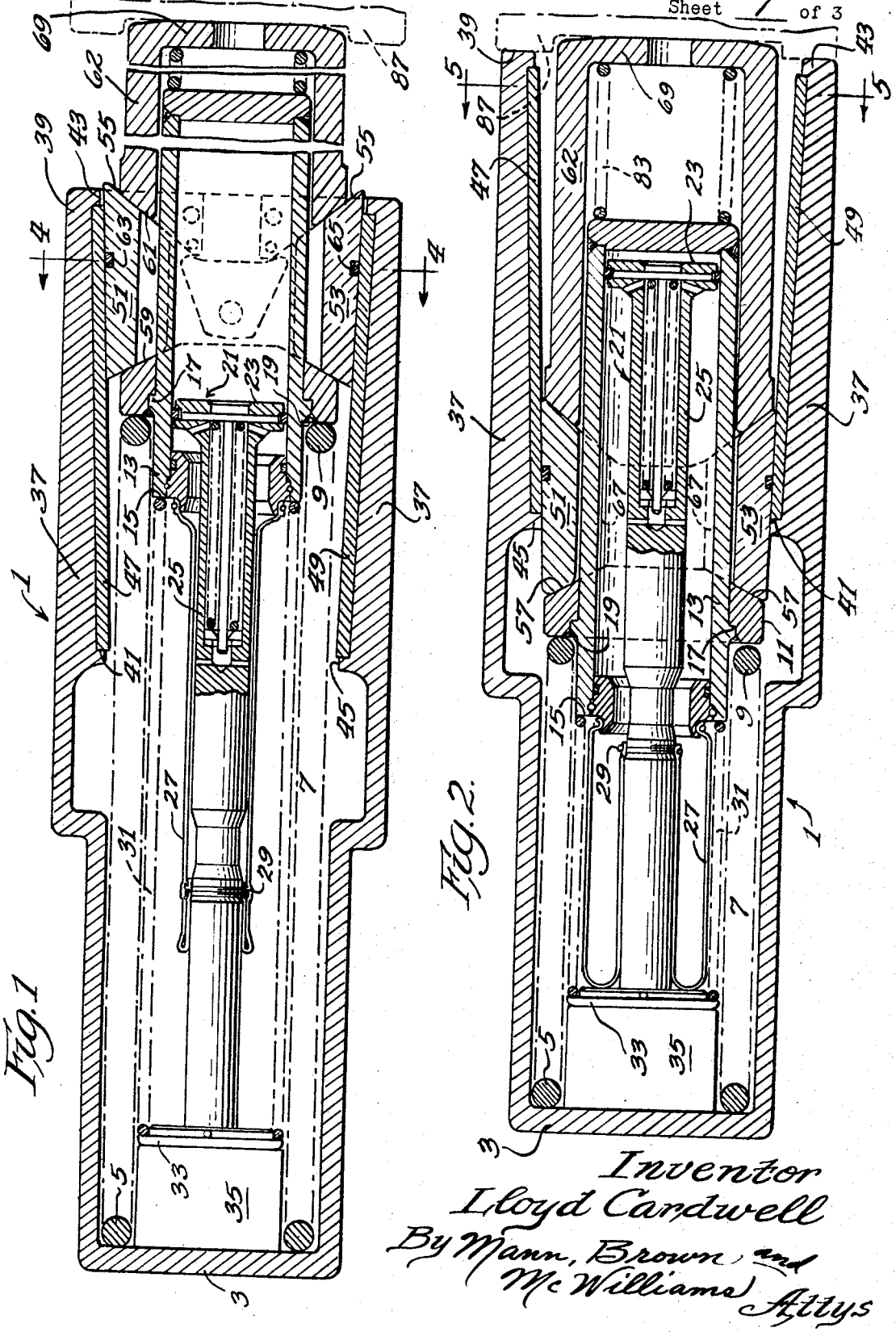

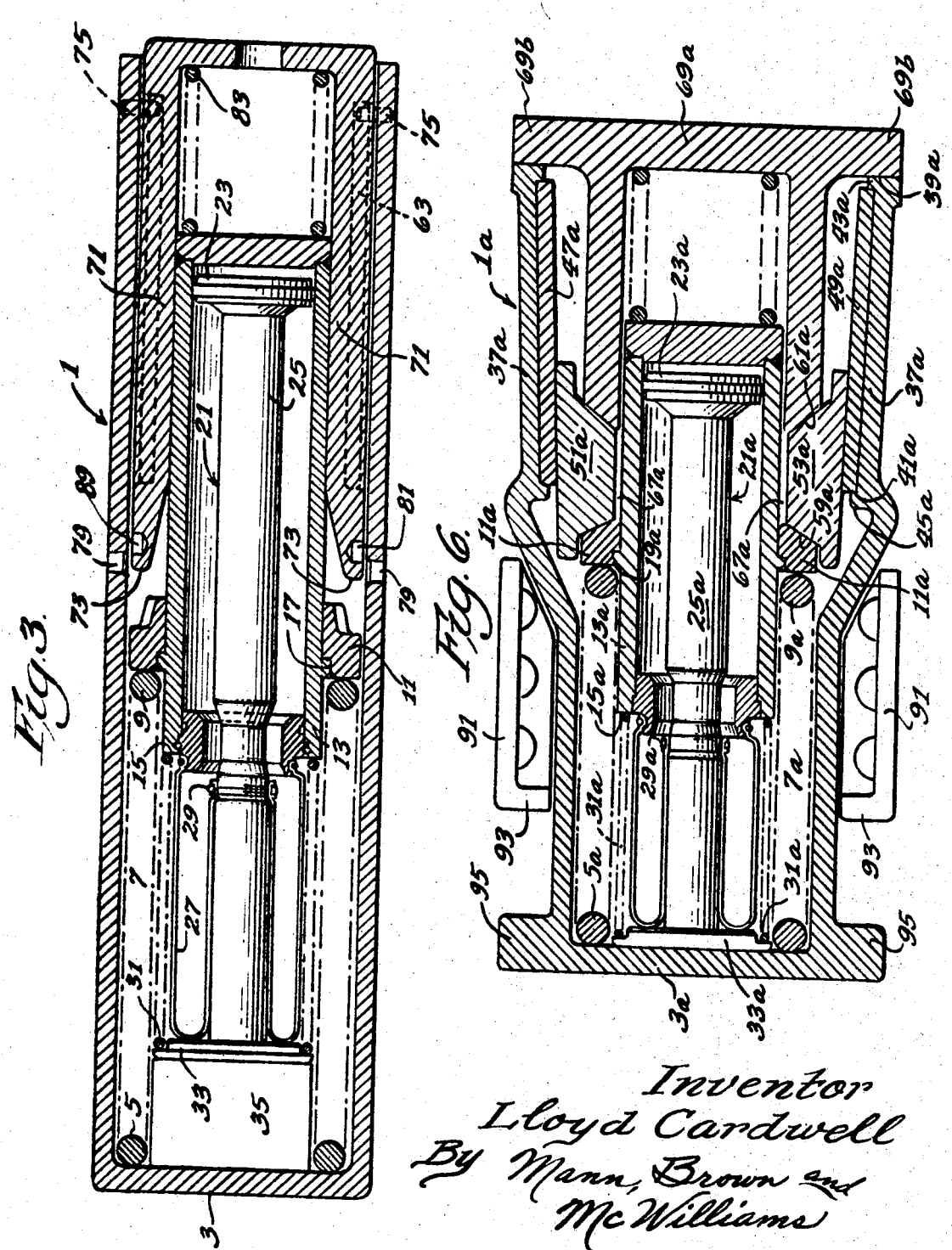

Inventor
Lloyd Cardwell
By Mann, Brown & McWilliams
Attys ial view through the center of a modified form of draft gear in accordance with the invention.

United States Patent Office 3,447,693
Patented June 3, 1969

3,447,693
COMBINED HYDRAULIC CUSHION-FRICTION CLUTCH DRAFT GEAR
Lloyd Cardwell, Chicago, Ill., assignor to Cardwell Westinghouse Company, a corporation of Delaware
Continuation-in-part of application Ser. No. 520,208, Jan. 12, 1966. This application Nov. 2, 1967, Ser. No. 680,205
Int. Cl. B61g 9/08, 9/10, 9/20
U.S. Cl. 213—22        10 Claims

ABSTRACT OF THE DISCLOSURE

A combination friction clutch and hydraulic draft gear for railroad cars in which the friction clutch elements are mounted alongside the hydraulic cushioning unit instead of in front of it as in Patent No. 3,150,782, thereby providing greater travel length for a given gear length. The friction clutch arrangement which makes shorter construction possible for any given travel length comprises two oppositely positioned movable clutch members, the outer walls of which are in frictional engagement with fixed clutch members. The surfaces of the ends of the movable members are sloped toward each other and abut matching sloping surfaces on a collar, mounted intermediate the ends of the cylinder of the hydraulic cushioning device, and a ram adapted to reciprocate between the housing and the hydraulic cushioning cylinder. The draft gear is equipped with necessary springs to assist in resisting forces applied to the gear and returning the gear to release position.

Cross-reference to related applications

This application is a continuation-in-part of application Ser. No. 520,208, filed Jan. 12, 1966, now Patent No. 3,368,698.

Brief summary of the invention

Draft gears for railroad cars of the combined hydraulic cushion-friction clutch type which are now in commercial use with the hydraulic cushion-friction clutch elements arranged in tandem manner similar to that shown in Campbell Patent No. 3,150,782. Draft gears of this type are designed to fit into a 36-inch pocket and give a travel of about 4¾ inches, or to fit into a 24-inch pocket and give a travel of 3¼ inches.

The draft gear which constitutes the subject matter of this application provides for longer travel for a draft gear designed to fit into the same size pockets as present gears. For example, the draft gear of the present invention designed for application to a 36-inch pocket will have a cushion travel of 8 inches, and when designed for application to a 24-inch pocket it will provide a cushion travel of 5 inches. The longer travel is effective to smooth out the force to which the car couplers are subjected on either draft or buff.

The increased cushion travel is obtained by placing the friction clutch alongside the hydraulic cushion element instead of in tandem therewith, i.e., in front of it, thereby making it possible to lengthen the cylinder of the hydraulic cushioning element. Special arrangement of friction clutch elements around the hydraulic cushioning unit, coupled with an elongated ram element gives the desired travel length to the cushioning device.

Brief description of the drawings

FIGURE 1 is a longitudinal, horizontal, cross-sectional view through the center of a draft gear in accordance with the invention showing the gear in release position.

FIGURE 2 is a longitudinal, horizontal, cross-sectional view similar to FIG. 1 but in the fully compressed position.

FIGURE 3 is a partial longitudinal, vertical, cross-sectional view through the center of the draft gear showing certain structural features of the gear.

FIGURE 6 is a longitudinal, horizontal, cross-sectional view through the center of a modified form of draft gear in accordance with the invention.

Detailed description of the invention

Figure 4:
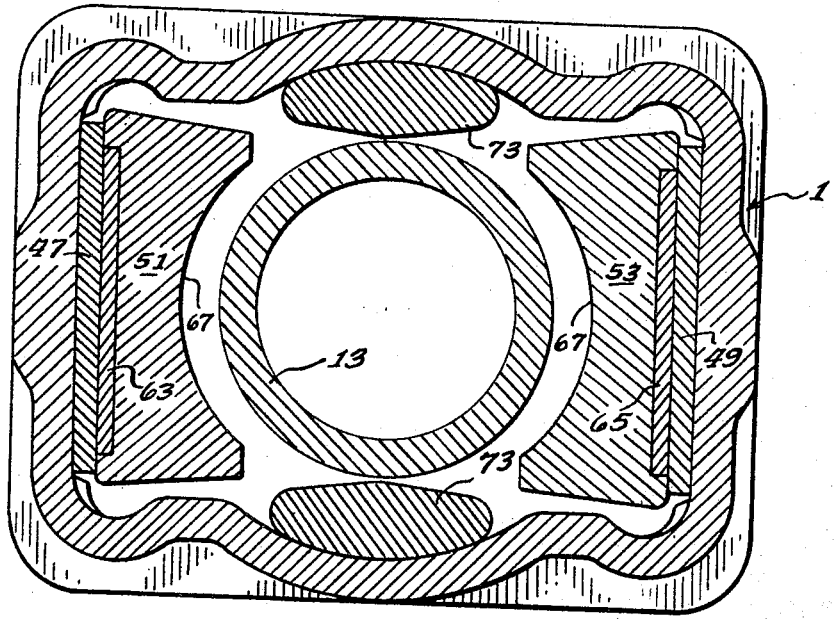
FIGURE 4 is a cross-sectional view along line 4—4 of FIGURE 1.
Figure 5:
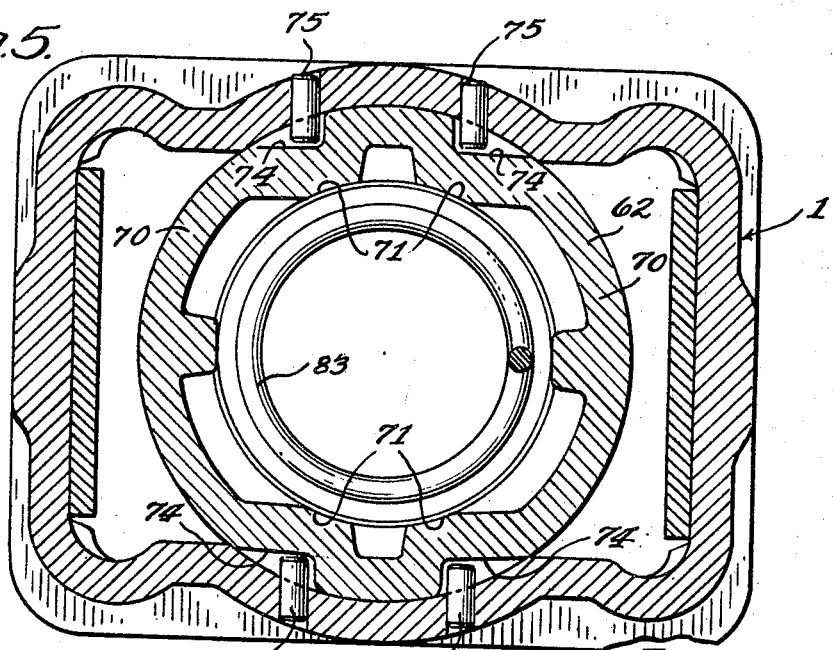
FIGURE 5 is a cross-sectional view along line 5—5 of FIGURE 2.

Referring to the drawings, the numeral 1 indicates generally the housing for the draft gear preferably made of cast steel. The housing is formed with end 3 which functions as a stationary spring follower for one end 5 of the main coil spring 7. The other end 9 of main spring 7 abuts against a collar 11 mounted on the outer wall of cylinder or chamber 13 adjacent the inner end thereof 15. The collar 11 fits against a flange 17 formed on the outside wall of cylinder 13 and is welded to the flange at 19. The numeral 21 indicates generally a piston composed of head 23 and stem 25. Piston 23 is adapted to fit snugly in chamber 13 in leak-proof relationship therewith and is constructed and operates as described in said Patent No. 3,368,698. The flexible boot 27 is fastened to the lower end of chamber 13, and the other end is fastened to the piston stem at 29 in the same manner as disclosed in said Patent No. 3,368,698. Coil spring 31 is mounted between the stationary follower plate 33 and end 15 of the wall of chamber 13. Spring 31 serves to urge the chamber 13 toward release position. The construction of piston 25 and the manner of attachment of the boot 27 to the chamber and to the piston stem are the same as described in said Patent No. 3,368,698 and disclosure with respect to this structure is incorporated by reference.

A filler 35, preferably a steel block, is inserted between the end wall 3 of the housing and the follower 33 to provide a solid surface against which follower 33 can abut.

The opposite inner wall portions 37 of the housing 1 are flat and gently tapered inwardly from the end 39 of the housing to the locus 41. These inner wall portions are formed with inwardly extending flanges 43 and 45. Fixed flat friction plates 47 and 49, preferably made of hardened steel, are mounted snugly against the inner wall portions 37 between the flanges 43 and 45. Fixed friction plates 47 and 49 are sufficiently long so as to accommodate movable friction shoes 51 and 53 preferably made of forged steel, for the entire stroke of the cushioning unit. Movable shoes 51 and 53 are formed with wedge-shaped ends 55 and 57 so that the two end faces of the shoes slope inwardly toward each other. Face 55 may have a slope of approximately 40 to 50 degrees and face 57 may have a slope of approximately 20 to 30 degrees. The end surfaces 55 and 57 of the movable shoes are wedged between face 59 of the collar 11 and face 61 of ram 62. The faces 59 and 61 are sloped at the same angle as at faces 57 and 55. The shoes 51 and 53 are preferably formed with elongated recesses or slots 63 and 65 filled with a packing material such as a brass alloy bar press fitted into the slot in order to lubricate the friction surface and provide a more uniform friction force between shoes and the friction plates 47 and 49 throughout the stroke. The inner arcuate surface 67 of the shoes is spaced a sufficient distance from the wall of chamber 13 to allow the movable shoes 51 and 53 to move inwardly toward the chamber upon compaction of the draft gear.

The ram 62 is of generally round, cylindrical configuration with an opening in the center of the outer end 69. The contour of the walls 70 of the ram 62 immediately above the shoes 51 and 53 is arcuate conforming to the arcuate shape of the inner surface shoes 51 and 53, but the contour of the wall 71 of the ram between the shoes is such as to fit closely against the inner wall of the housing. End 73 of wall 71 extends into the housing when the draft gear is in released position, thus acting as a guide for the ram. Wall 71 is shaped as shown at 74 to provide a space between the ram wall and the inner housing wall. Guide pins 75 extend through the wall of the housing adjacent its end 39 and function to prevent the ram from turning as it reciprocates. Holes 79 and recesses 81 are provided in the housing and ram, respectively, in which to place shear pins to hold the gear in sufficient compression so that it is short enough for free entry into the draft gear pocket for mounting purposes. Coil spring 83 is mounted between the end 85 of chamber 13 and the end 69 of ram 62 in order to force the ram into full release position. Mounted against the end 69 of the ram 62 is the the movable follower 87.

FIGURE 6 shows a different modification of the draft gear for an 8-inch travel embodying the invention and intended for application to a 36-inch pocket. 1a represents generally the housing having an end 3a which functions as a stationary spring follower for one end 5a of the main coil spring 7a. The other end 9a of the main spring abuts against collar 11a mounted on the outer wall of cylinder or chamber 13a intermediate the ends thereof. Piston 21a is composed of head 23a and stem 25a and is similar to and operates in the same manner as the piston described in connection with FIGURES 1 to 3. Coil spring 31a is mounted between stationary follower plate 33a and end 15a of the chamber wall. Opposite inner wall portions 37a of the housing are flat and genelty tapered inwardly from the end 39a to the locus 41a and are formed with inwardly extending flanges 43a and 45a. Fixed friction plates 47a and 49a are mounted on the wall portions 37a. Movable friction shoes 51a and 53a formed with wedge-shaped ends 55a and 57a are wedged between face 59a of collar 11a and face 61a of ram 62a. The shoes 51a and 53a have an arcuate inner surface 67a concentric with the cylinder or chamber 13a and are spaced therefrom a sufficient distance to enable the shoes to move inwardly toward the chamber when the draft gear is under compaction. The outer end 69a of the ram 62a has outwardly extending flanges 69b which are adapted to abut against end 39a of the housing in fully compacted position. The opposite walls of the ramp between the movable shoes are formed with elongated recesses (not shown) into which pins (not shown) extend from the housing to act as guides for the ram and prevent it from turning.

In order to enable the draft gear to operate under buff as well as draft, there is mounted on the sills of the car pocket two oppositely placed stop elements 91 having L-shaped ends 93 adapted to engage the flange 95 of end 3a to limit the stroke of the draft gear in draft. By placing an appropriate yoke around end 3a similar to that shown and described in Patents Nos. 2,825,472 and 3,178,036, the gear can be made to operate under buff and draft.

Operation of the device is as follows: Upon impact of a car against the follower 87 of the car in which the draft gear is mounted, ram 62 is forced inwardly of the housing by reason of the fact that the shoes 51 and 53 are wedged between the ram and the collar 11 against which the force of the main spring 9 is exerted. The movement of the shoe produces frictional resistant force against the fixed friction plate. Simultaneously with the increase in frictional resistance, the hydraulic cushioning unit becomes effective by reason of the pressure set up in the chamber 13 by reason of the inward movement of the chamber against the fixed piston head 23. The sudden build-up in pressure in the hydraulic chamber causes the metering valve in the piston to open in the manner described in said Patent No. 3,368,698 and to gradually release the pressure in the chamber over the entire stroke of the hydraulic device. By reason of the fact that the stroke is lengthened, the maximum force to which the coupler is subjected is substantially reduced while at the same time the force is kept relatively constant over the entire stroke of the draft gear, thereby contributing to longer car life and reduced lading damage. When the impaction stroke of the device has been completed and the compaction force has been reduced to a level such that it is overcome by the main spring 7, the main coil spring 7 acting against the collar 11 forces the chamber, movable shoes and ram 62 back to release position. It will be apparent that the shoes will engage the fixed friction plates, and function regardless of whether or not the cushioning device is operatively functioning.

Although the draft gear has been described as having a hydraulic cushioning unit similar to that claimed in said Patent No. 3,368,698, it will be understood that other types of hydraulic cushioning units may be used, such as those disclosed in Campbell et al. Patent No. 3,150,782.

I claim:
1. A draft gear comprising
 (a) an elongated housing structure having side walls and an end wall, the latter being adapted to act as a spring follower,
 (b) a metered hydraulic cushioning unit centrally mounted lengthwise in said housing,
 (c) a friction clutch structure concentric with said cushioning unit, said structure being comprised of at least one fixed element and at least one movable element relative to said housing,
 (d) the movable elements of said clutch being positioned between the side walls of said housing and said cushioning unit,
 (e) means for operatively engaging said frictional elements independently of functioning of said cushioning unit,
 (f) the movable elements of said clutch operatively engaging said cushioning unit in a manner to enable said clutch and said cushioning unit to act simultaneously, and
 (g) spring means acting between said spring follower and said cushioning unit to release the draft gear.

2. A draft gear in accordance with claim 1 in which
 (h) the cushioning element includes a chamber reciprocable relative to said housing and a piston stationary relative to said housing, and
 (i) said movable friction clutch element is positioned between the side walls of the housing and said chamber.

3. A draft gear in accordance with claim 2 in which
 (j) the movable friction clutch member has opposite end faces which slope toward each other,
 (k) said chamber has a collar rigidly fastened thereto, said collar having a sloping face against which one face of the movable clutch member is adapted to abut, the face of said collar sloping in the same direction as the abutting face of the movable member,
 (l) a ram member abutting the opposite face of said movable friction clutch member,
 (m) said movable member is wedged between said collar and said ram member, and
 (n) the face of the ram member abutting the opposite face of the movable member slopes in the same direction as the abutting face of the movable member.

4. A draft gear in accordance with claim 3 in which
 (o) opposite end faces of the movable clutch member slope toward each other from the surface adjacent the fixed clutch element to the surface adjacent said chamber.

5. A draft gear in accordance with claim 4 in which
 (p) there are two oppositely located movable clutch members.

6. A draft gear in accordance with claim 5 in which
 (q) the ram member is a hollow member surrounding the chamber and of sufficient cross-sectional area to permit the chamber to reciprocate in said hollow member.

7. A draft gear in accordance with claim 6 in which
(r) said ram member has at least two elongated slots in its outside wall running in the same direction as said movable clutch members reciprocate and said housing has fixed pins projecting into said slots.

8. A draft gear in accordance with claim 6 in which
(s) the chamber is circular in cross section,
(t) the housing and ram have two oppositely disposed arcuate wall sections concentric with said chamber, and
(u) said oppositely disposed arcuate ram wall sections are of such thickness as to fit snugly but not tightly between the housing and chamber walls.

9. A draft gear in accordance with claim 8 in which
(v) the two movable clutch members are diametrically separated from each other and the inner end of said oppositely disposed arcuate ram wall sections extend between said movable clutch members.

10. A draft gear in accordance with claim 9 in which
(w) the contacting friction surfaces of the fixed and movable clutch member are flat.

References Cited

UNITED STATES PATENTS

| | | | |
|---|---|---|---|
| 3,023,915 | 3/1962 | Keller | 213—31 |
| 3,367,515 | 2/1968 | Clejan et al. | 213—22 |
| 3,150,782 | 9/1964 | Campbell et al. | 213—43 |

DRAYTON E. HOFFMAN, *Primary Examiner.*

U.S. Cl. X.R.

213—32, 37, 43, 45